US008561179B2

(12) United States Patent
Durfee et al.

(10) Patent No.: US 8,561,179 B2
(45) Date of Patent: Oct. 15, 2013

(54) METHOD FOR IDENTIFYING UNDESIRABLE FEATURES AMONG COMPUTING NODES

(75) Inventors: Glenn Edward Durfee, San Francisco, CA (US); James D. Thornton, Redwood City, CA (US); Chi Shing Kwan, Foster City, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 908 days.

(21) Appl. No.: 12/176,780

(22) Filed: Jul. 21, 2008

(65) Prior Publication Data

US 2010/0014432 A1   Jan. 21, 2010

(51) Int. Cl.
*G06F 11/00* (2006.01)
*G06F 12/14* (2006.01)
*G06F 15/173* (2006.01)

(52) U.S. Cl.
USPC .............. 726/22; 726/23; 726/24; 709/223; 709/224; 714/38.14; 714/39

(58) Field of Classification Search
USPC .................... 726/22, 23, 24, 25, 26; 700/110; 714/38.14, 33, 37, 39; 709/223, 224
See application file for complete search history.

(56) References Cited

U.S. PATENT DOCUMENTS

| | | | | |
|---|---|---|---|---|
| 6,704,874 B1 * | 3/2004 | Porras et al. | | 726/22 |
| 6,769,066 B1 * | 7/2004 | Botros et al. | | 726/23 |
| 7,260,846 B2 * | 8/2007 | Day | | 726/23 |
| 7,581,003 B2 * | 8/2009 | Macbeth et al. | | 709/225 |
| 7,917,393 B2 * | 3/2011 | Valdes et al. | | 726/23 |
| 2002/0032871 A1 * | 3/2002 | Malan et al. | | 713/201 |
| 2008/0229153 A1 * | 9/2008 | Li et al. | | 714/39 |

OTHER PUBLICATIONS

R. Sekar, A. Gupta, J. Frullo, T. Shanbhag, A. Tiwari, H. Yang, S. Zhou, "Specification-based anomaly detection: a new approach for detecting network intrusions", CCS '02 Proceedings of the 9th ACM conference on Computer and communications security, Nov. 2002. pp. 265-274. [retrieved fronm ACM database Jul. 18, 2011].*

W. Lee, S. Stolfo, "A framework for constructing features and models for intrusion detection systems", ACM Transactions on Information and System Security (TISSEC) TISSEC Homepage archive vol. 3 Issue 4, Nov. 2000. [retrieved from ACM database Jul. 18, 2011].*

(Continued)

*Primary Examiner* — Saleh Najjar
*Assistant Examiner* — Lashanya Nash
(74) *Attorney, Agent, or Firm* — Shun Yao; Park, Vaughan, Fleming & Dowler LLP

(57) ABSTRACT

One embodiment of the present invention provides a system for identifying undesirable features in a network of computers. During operation, the system detects an anomaly associated with a node in the network. Next, the system identifies one or more features which are associated with the anomaly. The system then updates the identified features. Next, the system communicates the information corresponding to updated features to at least one other node in the network. The system then receives information indicating a correlation between the updated features and the anomaly from at least one other node in the network. Next, the system correlates the updated features with the anomaly based on the received information. The system subsequently produces a result which indicates a correlation between the updated features and the anomaly.

24 Claims, 4 Drawing Sheets

(56) References Cited

OTHER PUBLICATIONS

Bo Sun; Osborne, L.; Yang Xiao; Guizani, S.;"Intrusion detection techniques in mobile ad hoc and wireless sensor networks", This paper appears in: Wireless Communications, IEEE. Oct. 2007 vol. 14 Issue:5, pp. 56-63 [retrieved from IEEE database on Nov. 20, 2011].*

Kannadiga, P.; Zulkernine, M., "DIDMA: a distributed intrusion detection system using mobile agents", Software Engineering, Artificial Intelligence, Networking and Parallel/Distributed Computing, 2005 and First ACIS International Workshop on Self-Assembling Wireless Networks. SNPD/SAWN 2005. pp. 238-245 [retrieved from IEEE database on Aug. 7, 2012].*

Wang, Helen J., et al., Automatic Misconfiguration Troubleshooting with PeerPressure, Microsoft Research, USENIX Proc. 6th Symposium on Operating Systems Design & Implementation, (2004), http://research.microsoft.com/research/pubs/view.aspx?id=1360&type=Publication.

* cited by examiner

METHOD FOR IDENTIFYING UNDESIRABLE FEATURES AMONG COMPUTING NODES

GOVERNMENT LICENSE RIGHTS

The United States Government has a paid-up license in this invention and the right in limited circumstances to require the patent owner to license others on reasonable terms as provided for by the terms of Agreement No. FA8750-06-C-0182 awarded by the AFRL/Sri International.

FIELD

The present disclosure relates generally to computer security. More specifically, the present disclosure relates to a method for identifying undesirable features in a network of computers.

RELATED ART

A "Holy Grail" of computer security is automatic identification, recovery, and inoculation against so-called "zero-day attacks:" self-propagating malicious software previously unknown to the "good guys." Existing intrusion or attack detection mechanisms can often detect the presence of a Zero-Day attack by observing anomalous program or network activity, but these tools are typically unable to accurately identify the full attack "footprint:" all the elements associated with malicious software, e.g., files and other machine-configuration state changes, which should be reverted to remove offending software.

Microsoft® Research's Strider Troubleshooter project is used to troubleshoot improperly configured registry entries. The output of Strider Troubleshooter is a list of registry entries, ranked according to a heuristic algorithm, intended for human examination and remediation. But this list contains a large number of "false positives" (harmless alterations to the machine state that should not be reverted) and requires a human as part of the process. Strider is a troubleshooter because a human must first realize that there's a problem on their machine and then the human must go through a set of manual steps to identify features that might be responsible for the problem.

The technology of Triumfant, Inc. automatically generates an adaptive reference model from snapshots of the configurations of many machines and uses this model for anomaly detection. The technology also incorporates a set of recognition filters and research capabilities that can trigger automated response actions when anomalies are matched. But the Triumfant technology does not automatically identify offending software locally, based on the input of attack detectors. Instead, the Triumfant technology relies on knowledge bases of known attacks, thus does not address zero-day attacks.

In sum, current methods for identifying the footprint of malicious software are painstaking because they usually involve a highly trained specialist such as a computer security expert. Semi-automated methods such as Microsoft's Strider and the technology of Triumfant provide the specialist with more data but still require human expertise for detection of zero-day attacks.

SUMMARY

One embodiment of the present invention provides a system for identifying undesirable features in a network of computers. During operation, the system detects an anomaly associated with a node in the network. Next, the system identifies one or more features which are associated with the anomaly. The system then updates the identified features. Next, the system communicates the information corresponding to updated features to at least one other node in the network. The system then receives information indicating a correlation between the updated features and the anomaly from at least one other node in the network. Next, the system correlates the updated features with the anomaly based on the received information. The system subsequently produces a result which indicates a correlation between the updated features and the anomaly.

In one variation of this embodiment, the system updates the identified features by removing those features that have not changed since a pre-specified state associated with the node.

In one variation of this embodiment, the system updates the identified features by adding features based on a policy.

In one variation on this embodiment, the system updates the identified features by removing those features whose frequency of occurrence in the network of computing nodes is above a pre-specified threshold.

In one variation on this embodiment, the system determines a measure of association between the correlated features and a non-malicious process and communicates that measure and the correlated features to at least one other node in the network.

In another embodiment of the present invention, the system receives at the node a measure and features, wherein a sender of the measure and the features has determined a measure of association between the features and a non-malicious process. Next the system controls, based on the measure, one or more of: creating, reading, updating, deleting, and executing the features at the node.

In one variation of this and other embodiments, the features are associated at the node with one or more of a file, a machine state, a communication port, a network state, one or more memory locations, and a registry entry.

In one variation of this embodiment, the features are based on one or more of: name or identifier, creation time, modification history, access history, content, location, owner, creator, access privilege, type, visibility, security, data integrity scheme, suffix, protection, usage, origin, version, checksum, cryptographic checksum, call graph, and a change in the features.

DETAILED DESCRIPTION

Figure 1:
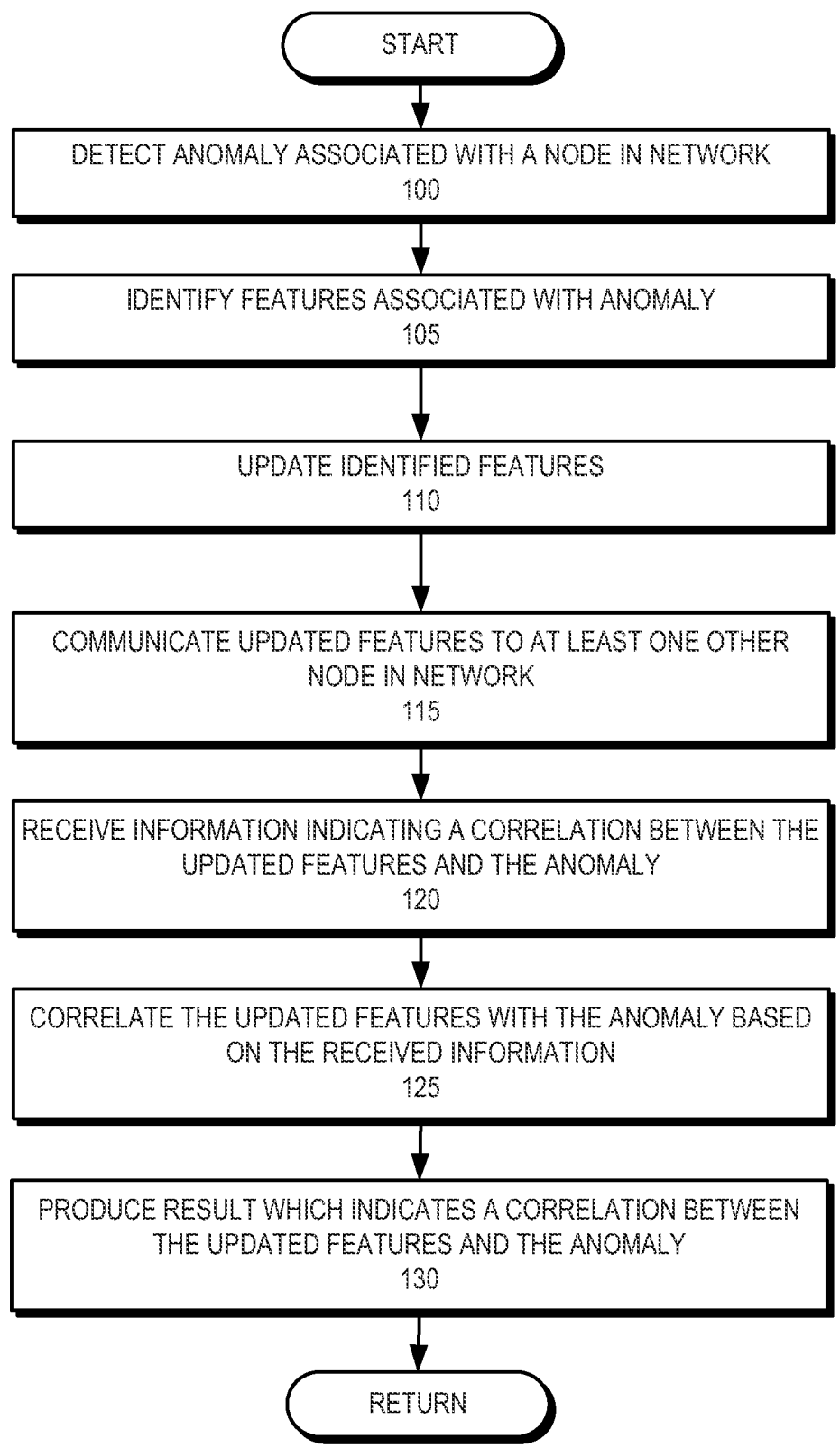
FIG. 1 presents a flowchart illustrating the operation of a system for identifying undesirable features in a network of computing nodes, in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

Overview

Embodiments of the present invention provide a system that can identify a footprint of possibly malicious software on a computing node in a network, given the knowledge that an attack is underway or has occurred, along with (possibly imperfect) information about which machines have been compromised. By tapping into information about the features at the node and information about the features at other nodes, the system can produce a list of features that are possibly associated with the offending software. These features can be automatically blocked, removed, or blacklisted at the node and other nodes in the network, thus thwarting a zero-day attack. A zero-day attack is an attack involving malicious software that was previously unknown to the "good guys." A footprint includes one or more features that the possibly malicious software has modified, deleted, or created. A feature is an aspect of the state at a node; features will be defined in more detail in subsequent sections.

The system can communicate features associated with a potential attack to at least one other node in the network, thereby enabling distributed identification of undesirable features. Distributed identification of undesirable features not only enables the system to make use of a collective opinion of multiple nodes in the network, but also allows each node to identify its own undesirable features. This is desirable because each node might be configured differently and hence be associated with different attack footprints.

Because the system does not require a human for identifying undesirable features and exploits the collective wisdom of the network of computing nodes, the system can reduce false alerts in determining whether or not a feature is associated with offending software. Note that an undesirable feature is one which is associated with offending software. Offending software can be a malfunctioning piece of legitimate software (i.e., a security flaw), spyware, malware, a virus, a normal process that goes awry, or any other software with malicious intent.

The system can combine several techniques to identify the attack footprint. Beginning with an initial candidate set of features based on a detected anomaly, the system can reduce the set of features based on several factors, including feature change history, feature occurrence frequency in the network of nodes, and machine state differencing. State differencing involves detecting and measuring the difference between two machine states. For example, in one state the feature might be present and in subsequent state the feature might be absent. The state difference in this example is that the feature is removed. The system can employ statistical methods to uncover correlations between suspected attack features and evidence of machine compromise to arrive at a final diagnosis, which can be used for recovery and inoculation.

Location of the System in a Network of Computing Nodes

The undesirable feature identification system can be located at any computing node in a network. A respective node can be an actual machine or a virtual machine. Multiple copies of the system can be operating independently and in parallel on multiple nodes in the network. The system identifies undesirable features in a distributed manner across an entire network of computing nodes. Thus, one node can enlist the help of other nodes to identify undesirable features by distributing the analysis across one or more nodes.

Features

In one embodiment of the present invention, the system identifies undesirable features. The features at a node can be associated with one or more of the following: a file, a machine state, a communication port, a network state, one or more memory locations, and a registry entry. For example, a feature might be associated with a particular file called "Evil.exe." Features can also involve individual packets flowing through the network.

More specifically, a feature can be based on a variety of state information associated with a computing node, such as: name or identifier, creation time, modification history, access history, content, location, owner, creator, access privilege, type, visibility, security, data integrity scheme, suffix, protection, usage, origin (whether the feature originated from the network, disc, or user input), version, checksum, cryptographic checksum, call graph (a graph of which processes where the edges represent a call from one process to another or some other file analysis other than file content or check sum), and change history. For instance, a file, machine state, communication port, network state, memory location, and/or registry entry, can be associated with one or more features. For example a feature associated with file "Evil.exe" might be its creation date. Another feature might be the file type, which in this case has the value of "executable." All features have values. A change in a feature refers to a change in the feature's value. For example, a feature might be the existence of a file; a change to this feature might be the creation of the file which did not exist in a prior state. The system can constantly or periodically monitor a configuration database for changes to a feature.

Features can also represent a sequence of one or more events in a given temporal order. For example, a feature whose binary value is a 1 might represent an access to two particular files in a given temporal order. Events can occur in parallel or in sequence, or can be based on specified timing requirements. Various methods can be used to represent temporal ordering of events, including: Markov decision processes, finite state machines, differential equations, flow charts, and decision trees.

In some embodiments of the present invention, a system administrator can configure the set of features. For example, a system administrator might exclude from the information features associated with files of an end user. A system administrator can configure the features in terms of file types, directories, and specific subsets of the file system.

In some embodiments of the present invention, the system can use features that are more general than files, as well as standard "attachment points" that malicious software typically hook into. For example, an attachment point might be an email contact list that malicious software might use to propagate a virus. In these embodiments, the features are associated with a polymorphic infection—malicious software that can change its attack footprint on each victim.

In some embodiments of the present invention, features can include an internal state of a database, special types of files not in the file system, particular ports to which a process is attached, what processes are running at a particular time, and characteristics of system performance, including memory usage, response time, and/or CPU time used. In general, features can be persistent (preserved in storage, e.g., a disk) or dynamic (related to a transient execution state, e.g., the priority of a process).

Machine and Network State

The state of the machine (node) comprises all possible features and their values at a particular time at the node. Similarly, the state of the network of computing nodes comprises the state of all nodes in the network and the state of communication lines linking the nodes.

Configuration Database

The system can maintain a configuration database which stores changes to the features and which features are used by which processes. The configuration database can also store an association between a detected anomaly and features associated with the anomaly. The configuration database can also be associated with a pre-specified state of the node. The pre-specified state (i.e., "golden" state) is a state of the node which was known to be anomaly free and can be used as a reference state. The pre-specified state can be an approved snapshot at a point in time that is considered with high confidence to be good according to another trusted process (e.g., when the operating system was first installed at the node). The pre-specified state can also be a state that is approved by a system administrator or is part of a known good (anomaly-free) software installation.

Knowledge-Sharing Facility

The system can also use a knowledge-sharing facility to which nodes in the network can post and read information such as whether or not a particular feature appears on a node. The knowledge-sharing facility can store and update the occurrence frequency of a feature in the network. Various methods can be used to implement the knowledge-sharing facility, including blackboards, spreading information through network routing, mail, and instant messaging. A blackboard is an area of shared memory where knowledge can be posted or read. In some embodiments, a centralized server can collect, store, and disseminate the feature-related information from and to the nodes.

Access to Information Outside a Computing Node

The system can also access information outside a computing node on which it resides. Such information can include content, patterns, and behavior of both inbound and outbound network traffic. This access can be performed through the knowledge-sharing facility described above or through monitoring of the information outside the computing node.

Detecting Anomalies

The system can use one or more anomaly detectors to detect an anomaly. An anomaly is any state of the machine that is non-normal. For example, an anomaly can be a process which is consuming an unusual amount of memory or computational resources relative to normal memory or computational resource usage. An anomaly detector in this case can determine whether a process is consuming more memory or computational resources, given a pre-specified threshold of memory or computational resources that a process of that type is likely to consume.

An anomaly can also be associated with an abnormal modification of a normal program. For example, a computer virus can be viewed as an abnormal modification of a normal program because it has inserted its viral code into the normal program. Similarly, network traffic can have an unusual or abnormal pattern, which can be construed as anomalous.

In some embodiments of the present invention, anomaly detection involves developing a model of normal behaviors and detecting abnormalities as deviations from that model. An advantage of this embodiment is that the system can adapt to an individual node or user or network and can be less vulnerable to an attack.

More generally, anomaly detection can involve various machine-learning methods. For example, the system can build a classifier system from examples of normal and anomalous data, and then use that classifier system to predict whether or not an unseen example is anomalous. The input can be features of the machine state, and the output can be a classification of the type (i.e., normal vs. one or more anomaly types) and can include the strength of the classification (e.g., the probability of anomaly).

Anomaly detection can also involve a system administrator defining a baseline (normal) state of the system or network traffic. This definition might include the network's traffic load, network traffic content and type, protocol, and typical packet size. The anomaly detector can monitor network segments to compare their state to the normal baseline while detecting anomalies.

The anomaly detector can be localized (on a node), distributed across the network, or on a machine that is not part of the network. The anomaly detector can be based on the same or a different set of features than those used by the system to identify undesirable features.

Overall System Operation

FIG. 1 presents a flowchart illustrating the operation of a system for identifying undesirable features in a network of computing nodes in accordance with an embodiment of the present invention. During operation, the system detects an anomaly associated with a node in the network (operation 100). The previous section presented examples of anomaly and various methods for detecting an anomaly.

Next, the system identifies one or more features which are associated with the anomaly (operation 105). To identify the features associated with the anomaly, the system can use the configuration database or another database which stores the information about an association. The system then updates the identified features (operation 110). Next, the system communicates the updated features to at least one other node in the network (operation 115). The communication can use various modes including client-to-server, peer-to-peer, server-to-client, email, a knowledge-sharing facility such as electronic blackboards, and direct communication through network routing. The system communicates the updated features to at least one other node in the network to gain information about the features from other nodes in the network. If other nodes are experiencing the same feature, it could indicate a normal (non-anomalous) situation, or it could indicate a mass attack.

After communicating the updated features to other nodes in the network, the system then receives information indicating a correlation between the features and the anomaly (operation 120). The system can use this information to better decide if a particular feature is undesirable through the power of the "crowd," which is represented by the other nodes in the network.

Next, the system correlates the features with the anomaly based on the received information (operation 125). The correlation can also be based on those features present on a majority of nodes associated with the anomaly, and on those features not present on the majority of nodes not associated with the anomaly. For example, if a majority of nodes associated with the anomaly have a file named Evil.exe and a majority of nodes not associated with the anomaly do not have a file named Evil.exe, the system can infer that Evil.exe is correlated with the anomaly.

The system can use various other correlation methods depending on the type of anomaly and the configuration of the network of nodes, including machine learning, regression analysis, statistical analysis, correlation analysis, and analysis of variance.

Subsequently, the system produces a result which indicates a correlation between the updated features and the anomaly (operation 130). The particular form of the result can depend upon the method of correlation. For example, a machine-learning method can produce a result which indicates a correlation by producing the parameters associated with a classifier system.

To illustrate the distributed nature of the system, consider the following scenario. The anomaly detectors on various nodes notice a potential attack occurring in the form of a malfunctioning program (an example of operation 100). The nodes involved in the potential attack analyze the malfunctioning program by finding features that are associated with the anomaly. A node performing the analysis first queries the configuration database with the name of the offending program to produce an initial candidate set of features (an example of operation 105). Each node then eliminates features that are unchanged since the pre-specified state (an example of operation 110). Next, the system optionally updates the features by removing those features whose occurrence frequency in the network is above a pre-specified threshold. The system then communicates the updated features to other nodes to solicit comments from the other nodes (an example of operation 115).

In response, other nodes respond to this solicitation (example of operation 120). For example, another node might indicate whether the feature is present and whether the node is a victim of the same attack. When the system has received a sufficient number of responses, the system then correlates the updated features with an attack (an example of operation 125).

Embodiments of the present invention enable automatic identification of an attack footprint for the purposes of malicious software removal and inoculation. Because the method is automatic (i.e., the system does not require human interaction), it allows for a more effective and a more rapid response to a malicious software epidemic. Moreover, the method can be used to identify undesirable features associated with a zero-day attack.

In some embodiments of the present invention, the system can use specific domain knowledge (e.g., that certain file names are likely to contain executable content and therefore warrant extra caution) as part of its process to more accurately correlate the features to an anomaly.

Measuring Non-Maliciousness

Figure 2:
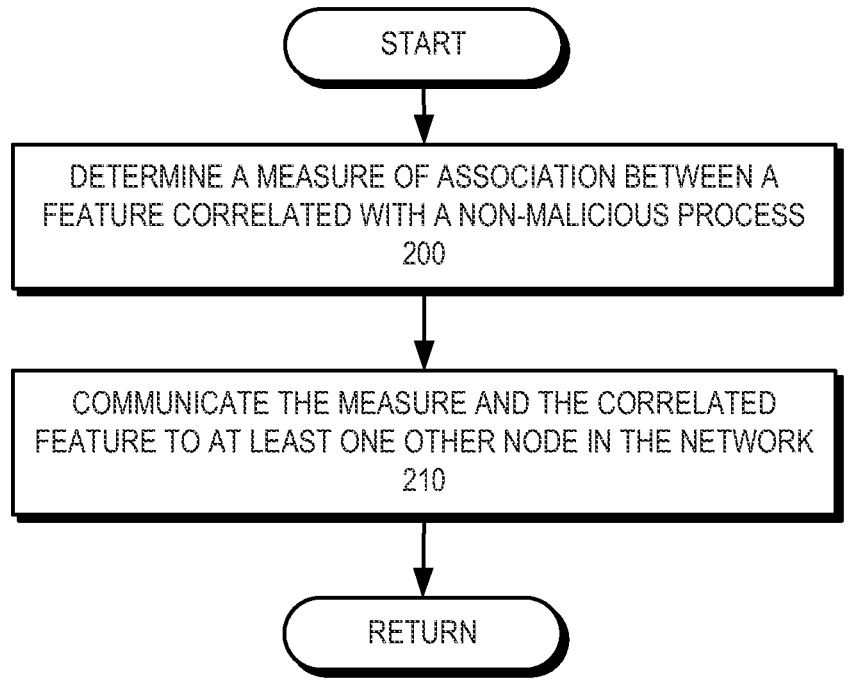
FIG. 2 presents a flowchart illustrating an exemplary process of determining a measure of association between a feature correlated with a non-malicious process, and communicating that measure to other nodes in the network, in accordance with an embodiment of the present invention.

FIG. 2 presents a flowchart illustrating an exemplary process of determining feature maliciousness and communicating that information to other nodes, in accordance with an embodiment of the present invention. Operation 200 determines a measure of association between a feature and a non-malicious process. Operation 210 communicates that measure to other nodes. In one embodiment, the measure (i.e., the measure of non-maliciousness) can be the extent to which the feature is associated with a non-malicious process. For example, a particular feature can be associated with the installation of a new version of Microsoft Word and hence can receive a high non-maliciousness score. The measure can be based on a database of features associated with known non-malicious processes and/or a database of a features associated with known malicious processes. This database can reside on each node or can be shared among the network of nodes.

Note that the measure can be binary (e.g., the features are definitely associated with a non-malicious process), scaled (e.g., a probability, which can be between 0 and 1), unscaled, or discrete (multi-valued). Note also that measure of an association between a feature and a malicious process can be derived by applying a complementary or inversion operation to the measure of an association between the feature and a non-malicious process. For example, suppose a particular set of features are determined to have a measure of 1 (on a scale of 0 to 1) for an association with a non-malicious process where 1 means "definitely" and 0 means "definitely not." The system can derive a measure of maliciousness by subtracting the non-maliciousness measure from 1.

Taking Action at Receiving Nodes

Figure 3:
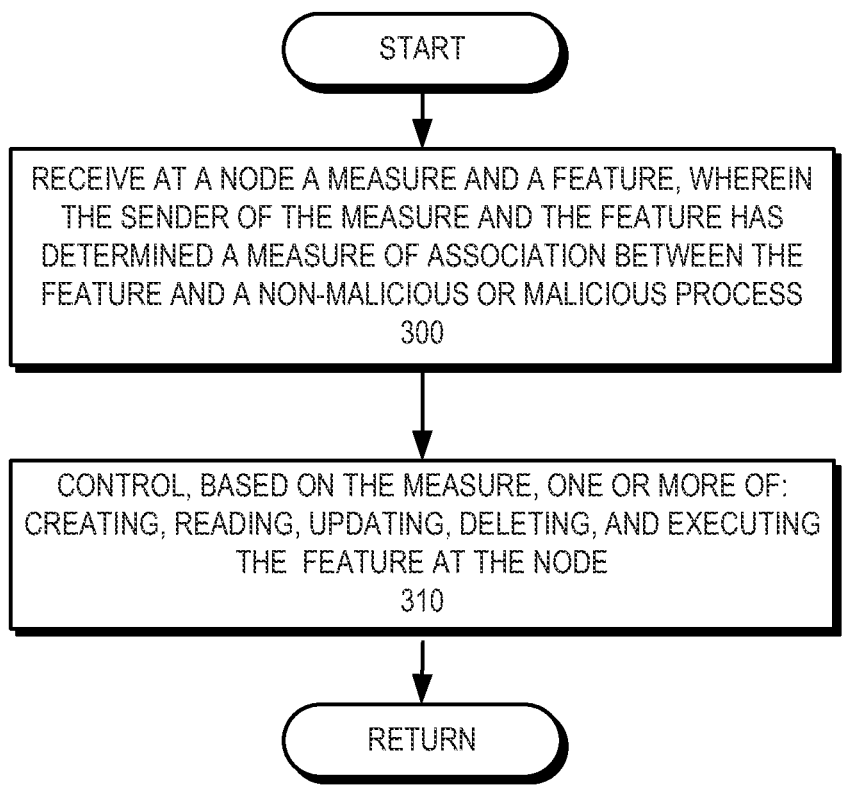
FIG. 3 presents a flowchart illustrating an exemplary process of a node receiving a measure of association between a feature and a non-malicious or malicious process and features and using the measure to control the creating, reading, updating, deleting, and/or executing of the corresponding feature at the node, in accordance with an embodiment of the present invention.

After communicating the measure of non-maliciousness and the feature to other nodes in the network, at least one other node in the network receives that measure of non-maliciousness and the features. FIG. 3 presents a flowchart illustrating an exemplary process of a node receiving a measure of association between a feature and a non-malicious or malicious process (operation 300). The system then uses the measure to control one or more of: creating, reading, updating, deleting, and executing the feature at the node (operation 310). The control of creating, reading, updating, deleting, and executing the feature can take many forms, including blacklisting the feature (disallowing creation of the feature), un-blacklisting the feature (allowing creation of the feature), blocking the feature (disallowing execution or read access of the feature), or unblocking the feature (allowing execution or read access). Various other actions associated with features such as files and registry entries are possible, including modification, cleaning, or repairing the feature.

The basis for control can include methods such as rules, machine classification, decision trees, neural networks, machine learning, regression analysis, statistical analysis, correlation analysis, and analysis of variance. For example, if the measure of non-maliciousness is high and the feature is currently blacklisted at the node, a rule might describe that the feature should be un-blacklisted.

Updating the Identified Features

In some embodiments of the present invention, the system can update the identified features by removing features that have not changed since a pre-specified state associated with the node. In further embodiments, the system can update the identified features by adding features to the identified features based on a policy. For example, the system can add features based on database of known malware and associated files. This can enable the system to add other features associated with malware even if the system has detected only a single feature associated with the malware.

In some embodiments of the present invention, the system can update the identified features by removing those features whose occurrence frequency in the network of computing nodes is above a pre-specified threshold.

In one embodiment, the occurrence frequency can be defined as the number of times a respective feature value appears in the network of computing nodes divided by the sum of the number of times each value of the feature appears in the network of computing nodes. Other definitions are also possible. The occurrence frequency computation can be adjusted by adding a pre-specified constant to the number of times each feature appears in the network of nodes. This pre-specified constant represents a prior belief and allows a user to emphasize or de-emphasize certain features over others, even when there is insubstantial statistical evidence. Such prior beliefs enable the system to make use of the knowledge of a user without interrupting the user for help during the system's operation.

Removing those features that are above a pre-specified threshold enables detection of an attack early in its spread across the network. In some embodiments of the present invention, when the attack is believed to have had substantial time to spread, the system can update the identified features by removing those features whose occurrence frequency in the network is below a pre-specified threshold. This allows the removal of features that are rare. If the attack has had substantial time to spread, features associated with the attack are not likely to be rare.

The pre-specified threshold can be set by a system administrator, can be based on the anomaly, or can be based on information that an attack has been underway for a certain amount of time, is underway, or is likely to be underway in a certain amount of time. The threshold can also be based on information associated with the duration of the attack.

Computer and Communication System

Figure 4:
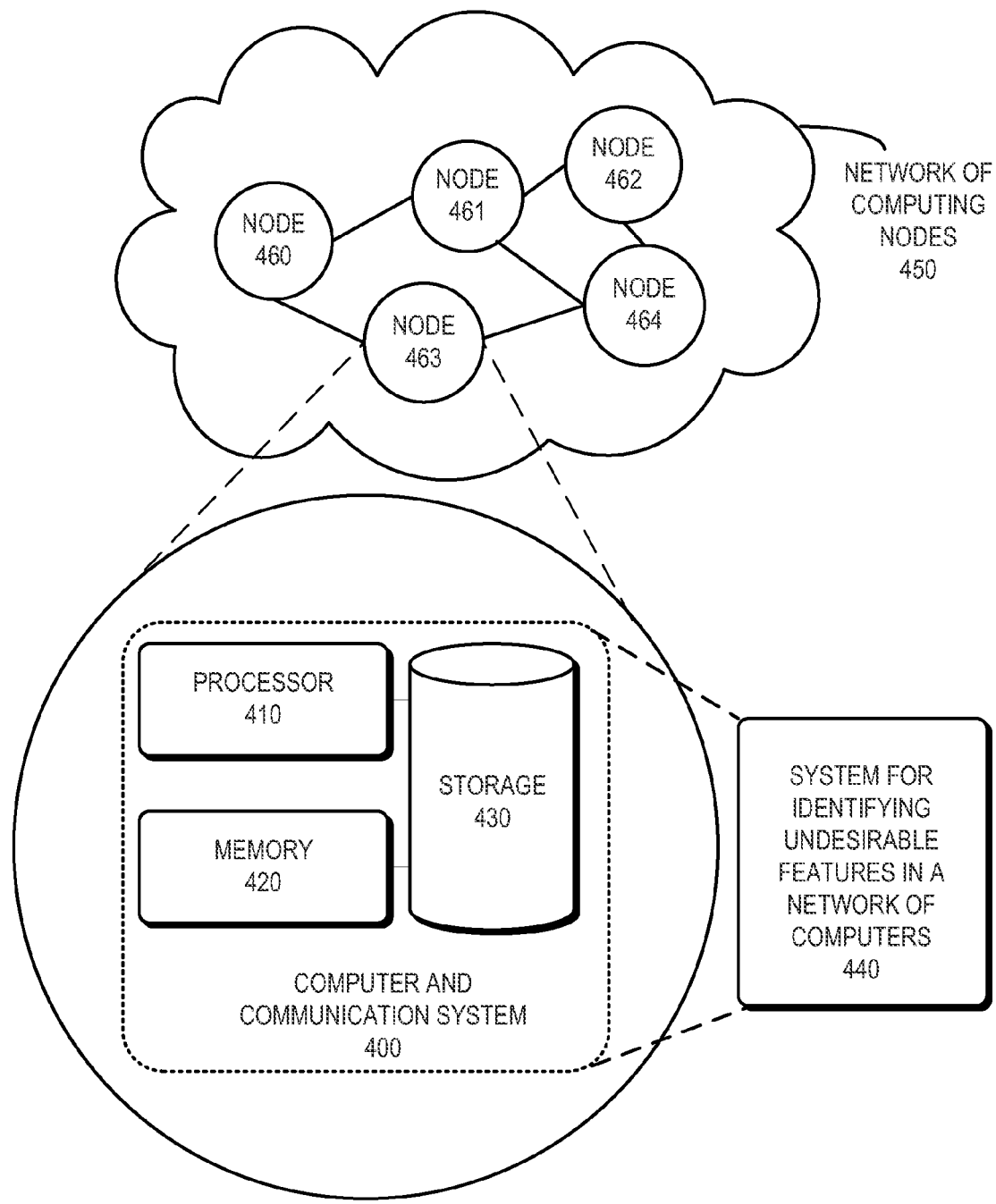
FIG. 4 illustrates an exemplary computer system for identifying undesirable features in a network of computers, in accordance with an embodiment of the present invention.

FIG. 4 illustrates an exemplary computer system for identifying undesirable features in a network of computers (i.e., computing nodes). In FIG. 4, a computer and communication system 400 includes a processor 410, a memory 420, and a storage device 430. Storage device 430 stores programs to be executed by processor 410. Specifically, storage device 430 stores a program for identifying undesirable features in a network of computers 440 on a node in that network. FIG. 4 also shows the context of the exemplary computer system: it can reside on any node (nodes 460-464) in the network of computing nodes 450. The network connections can be broadband, wireless, telephonic, satellite—or any type of network connection. Although FIG. 4 shows computer and communication system 400 as part of node 463, computer and communication system 400 can be included in any node in a network of computing nodes 450. During operation, the system for identifying undesirable features 440 is loaded from storage 430 into memory 420 and executed by processor 410. Nodes in the network can be coupled with peer-to-peer relationships, or client-server relationships, server-client relationships.

Figure 5:
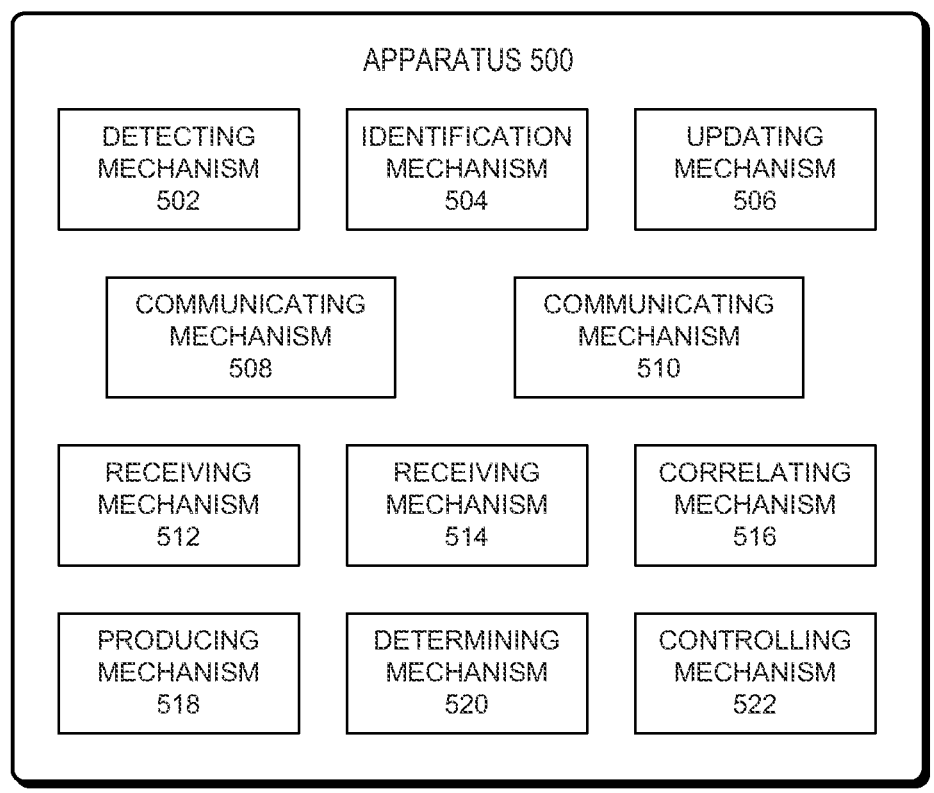
FIG. 5 illustrates an exemplary apparatus for identifying undesirable features in a network of computers, in accordance with an embodiment of the present invention.

FIG. 5 illustrates an exemplary apparatus 500 for identifying an undesirable feature in a network of computing nodes. Apparatus 500 can include a detecting mechanism 502, an identification mechanism 504, an updating mechanism 506, communicating mechanisms 508 and 510, receiving mechanisms 512 and 514, a correlating mechanism 516, a producing mechanism 518, a determining mechanism 520, and a controlling mechanism 522.

In some embodiments, detecting mechanism 502 is configured to detect an anomaly associated with a node in the network. Also, identification mechanism 504 is configured to identify one or more features which are associated with the anomaly, and updating mechanism 506 is configured to update the identified features.

Communicating mechanism 508 is configured to send a comment-soliciting request to at least one other node in the network, wherein the comment-soliciting request indicates the anomaly and the updated features. Further, receiving mechanism 512 is configured to receive, from at least one other node in the network, information indicating whether the at least one other node experienced a correlation between a first feature of the updated features and the anomaly.

Correlating mechanism 516 is configured to correlate the first feature with the anomaly based on the received information, and producing mechanism 518 is configured to produce a result which indicates a correlation between the first feature and the anomaly.

In some embodiments, determining mechanism 520 is configured to determine a measure of association between the first feature and a non-malicious process, and communicating mechanism 510 is configured to communicate the measure and the first feature to at least one other node in the network.

In some embodiments, receiving mechanism 514 is configured to receive at a node a measure and a second feature, wherein a sender of the measure and the second feature has determined a measure of association between the second feature and a non-malicious process. Further, controlling mechanism 522 is configured to control, based on the measure, one or more of: creating, reading, updating, deleting, and executing the second feature at the node.

The methods and processes described in the detailed description can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-executed method for identifying an undesirable feature in a network of computing nodes, comprising:
    detecting an anomaly associated with a node in the network, wherein the anomaly includes an abnormal state or configuration of the node;
    identifying one or more features which are associated with the anomaly;
    updating the identified features;
    sending a comment-soliciting request to at least one other node in the network, wherein the comment-soliciting request specifies the anomaly and the updated features;
    receiving, from at least one other node in the network, information indicating whether the at least one other node experienced a correlation between a first feature of the updated features and the anomaly;

correlating the first feature with the anomaly based on the received information; and producing a result which indicates a correlation between the first feature and the anomaly.

2. The method of claim 1, wherein updating the identified features comprises removing, from the identified features, a second feature that has not changed since a pre-specified state associated with the node.

3. The method of claim 1, wherein updating the identified features comprises adding a second feature based on a policy.

4. The method of claim 1, wherein updating the features comprises removing a second feature whose occurrence frequency in the network of computing nodes is above a pre-specified threshold.

5. The method of claim 1, further comprising:
determining a measure of association between the first feature and a non-malicious process; and
communicating the measure and the first feature to at least one other node in the network.

6. The method of claim 1, further comprising:
receiving at a node a measure and a second feature, wherein a sender of the measure and the second feature has determined a measure of association between the second feature and a non-malicious process; and
controlling, based on the measure, one or more of: creating, reading, updating, deleting, and executing of the second feature at the node.

7. The method of claim 1, wherein the first feature is associated with one or more of a file, a machine state, a communication port, a network state, a memory location, and a registry entry.

8. The method of claim 7, wherein the first feature indicates one or more of:
name or identifier;
creation time;
modification history;
access history;
content;
location;
owner;
creator;
access privilege;
type;
visibility;
security;
data integrity scheme;
suffix;
protection;
usage;
origin;
version;
checksum;
cryptographic checksum;
call graph; and
a change in the features.

9. An apparatus for identifying an undesirable feature in a network of computing nodes, comprising:
a processor;
a memory;
a detecting mechanism configured to detect an anomaly associated with a node in the network, wherein the anomaly includes an abnormal state or configuration of the node;
an identification mechanism configured to identify one or more features which are associated with the anomaly;
an updating mechanism configured to update the identified features;

a communicating mechanism configured to send a comment-soliciting request to at least one other node in the network, wherein the comment-soliciting request specifies the anomaly and the updated features;
a receiving mechanism configured to receive, from at least one other node in the network, information indicating whether the at least one other node experienced a correlation between a first feature of the updated features and the anomaly;
a correlating mechanism configured to correlate the first feature with the anomaly based on the received information; and
a producing mechanism configured to produce a result which indicates a correlation between the first feature and the anomaly.

10. The apparatus of claim 9, wherein while updating the identified features the updating mechanism is configured to remove, from the identified features, a second feature that has not changed since a pre-specified state associated with the node.

11. The apparatus of claim 9, wherein while updating the identified features, the updating mechanism is configured to add a second feature based on a policy.

12. The apparatus of claim 9, further configured to remove a second feature whose occurrence frequency in the network of computing nodes is above a pre-specified threshold.

13. The apparatus of claim 9, further comprising:
a determining mechanism configured to determine a measure of association between the first feature and a non-malicious process; and
a second communicating mechanism configured to communicate the measure and the first feature to at least one other node in the network.

14. The apparatus of claim 9, further comprising:
a receiving mechanism configured to receive at a node a measure and a second feature, wherein a sender of the measure and the second feature has determined a measure of association between the second feature and a non-malicious process; and
a controlling mechanism configured to control, based on the measure, one or more of: creating, reading, updating, deleting, and executing the second feature at the node.

15. The apparatus of claim 9, wherein the first feature is associated with one or more of a file, a machine state, a communication port, a network state, a memory location, and a registry entry.

16. The apparatus of claim 15, wherein the first feature indicates one or more of:
name or identifier;
creation time;
modification history;
access history;
content;
location;
owner;
creator;
access privilege;
type;
visibility;
security;
data integrity scheme;
suffix;
protection;
usage;
origin;
version;
checksum;

cryptographic checksum;
call graph; and
a change in the features.

17. A computer-readable storage device storing instructions that when executed by a computer cause the computer to perform a method for identifying an undesirable feature in a network of computing nodes, comprising:
   detecting an anomaly associated with a node in the network, wherein the anomaly includes an abnormal state or configuration of the node;
   identifying one or more features which are associated with the anomaly;
   updating the identified features;
   sending a comment-soliciting request to at least one other node in the network, wherein the comment-soliciting request specifies the anomaly and the updated features;
   receiving, from at least one other node in the network, information indicating whether the at least one other node experienced a correlation between a first feature of the updated features and the anomaly;
   correlating the first feature with the anomaly based on the received information; and
   producing a result which indicates a correlation between the first feature and the anomaly.

18. The storage device of claim 17, wherein updating the identified features comprises removing, from the identified features, a second feature that has not changed since a pre-specified state associated with the node.

19. The storage device of claim 17, wherein updating the identified features comprises adding a second feature based on a policy.

20. The storage device of claim 17, wherein updating the features further comprises removing a second feature whose occurrence frequency in the network of computing nodes is above a pre-specified threshold.

21. The storage device of claim 17, further comprising:
   determining a measure of association between the first feature and a non-malicious process; and
   communicating the measure and the first feature to at least one other node in the network.

22. The storage device of claim 17, further comprising:
   receiving at a node a measure and a second feature, wherein a sender of the measure and the second feature has determined a measure of association between the second feature and a non-malicious process; and
   controlling, based on the measure, one or more of: creating, reading, updating, deleting, and executing of the second feature at the node.

23. The storage device of claim 17, wherein the first feature is associated with one or more of a file, a machine state, a communication port, a network state, a memory location, and a registry entry.

24. The storage device of claim 23, wherein the first feature is based on one or more of:
   name or identifier;
   creation time;
   modification history;
   access history;
   content;
   location;
   owner;
   creator;
   access privilege;
   type;
   visibility;
   security;
   data integrity scheme;
   suffix;
   protection;
   usage;
   origin;
   version;
   checksum;
   cryptographic checksum;
   call graph; and
   a change in the features.

* * * * *